(12) United States Patent
Matsushita et al.

(10) Patent No.: US 9,991,831 B2
(45) Date of Patent: Jun. 5, 2018

(54) DC MOTOR CONTROL DEVICE AND GAME MACHINE

(71) Applicant: OMRON Corporation, Kyoto (JP)

(72) Inventors: Katsumi Matsushita, Aichi (JP); Hiroyuki Ibuki, Aichi (JP)

(73) Assignee: OMRON Corporation, Kyoto (JP)

( * ) Notice: Subject to any disclaimer, the term of this patent is extended or adjusted under 35 U.S.C. 154(b) by 0 days. days.

(21) Appl. No.: 15/509,463

(22) PCT Filed: Sep. 17, 2015

(86) PCT No.: PCT/JP2015/076537
§ 371 (c)(1),
(2) Date: Mar. 7, 2017

(87) PCT Pub. No.: WO2016/067787
PCT Pub. Date: May 6, 2016

(65) Prior Publication Data
US 2017/0279388 A1 Sep. 28, 2017

(30) Foreign Application Priority Data

Oct. 27, 2014 (JP) .................................. 2014-218664
Oct. 27, 2014 (JP) .................................. 2014-218666

(51) Int. Cl.
*H02K 29/12* (2006.01)
*H02P 7/298* (2016.01)
(Continued)

(52) U.S. Cl.
CPC .............. *H02P 7/2985* (2013.01); *A63F 7/02* (2013.01); *H02P 8/00* (2013.01)

(58) Field of Classification Search
CPC .... H02P 6/16; H02P 6/14; H02P 6/003; H02P 6/06; H02K 29/08; H02K 29/12;
(Continued)

(56) References Cited

U.S. PATENT DOCUMENTS 5,698,861 A * 12/1997 Oh .......................... A63H 18/16
250/206.1
5,723,855 A * 3/1998 Oh ............................ G01S 5/16
250/206.1
(Continued)

FOREIGN PATENT DOCUMENTS

JP    H5-248892 A     9/1993
JP    H7-218289 A     8/1995
JP    2014-73024 A    4/2014

OTHER PUBLICATIONS

International Search Report issued in corresponding Application No. PCT/JP2015/076537, dated Dec. 15, 2015 (5 pages).
(Continued)

*Primary Examiner* — Rina Duda
(74) *Attorney, Agent, or Firm* — Osha Liang LLP

(57) ABSTRACT

A DC motor control device includes a communication circuit configured to receive a control command specifying a target rotation amount for a DC motor, a sensor interface configured to receive a detection signal from a rotational angle sensor that outputs the detection signal every time the DC motor rotates by a certain rotational angle, a step counter that outputs a count signal every time the detection signal has been received a certain number of times, a controller that, based on the number of times the count signal received, determines a step count representing the total amount of rotation, and generates a control signal that controls the DC motor in accordance with the step count and the target rotation amount, and a drive signal generation circuit that generates a drive signal that rotates the DC motor in accordance with the control signal.

4 Claims, 11 Drawing Sheets

(51) Int. Cl.
*A63F 7/02* (2006.01)
*H02P 8/00* (2006.01)

(58) Field of Classification Search
CPC ..... H02K 29/10; G05F 17/32; G05F 17/3244; A63F 13/10; A63F 13/12
USPC ....... 318/569, 400.37, 400.39, 400.4, 400.38
See application file for complete search history.

(56) References Cited

U.S. PATENT DOCUMENTS

| | | | | |
|---|---|---|---|---|
| 5,800,263 | A * | 9/1998 | Hayashida | A63F 9/143 463/16 |
| 6,059,657 | A * | 5/2000 | Oh | A63F 9/143 250/206.1 |
| 7,499,828 | B2 * | 3/2009 | Barton | A63B 24/0003 473/220 |
| 8,696,434 | B2 * | 4/2014 | Tsukahara | G07F 17/3213 463/16 |
| 2006/0267538 | A1 * | 11/2006 | Takeda | H02P 8/38 318/685 |

OTHER PUBLICATIONS

Written Opinion issued in corresponding Application No. PCT/JP2015/076537, dated Dec. 15, 2015 (10 pages).

* cited by examiner

| OPERATION | TR1 | TR2 | TR3 | TR4 |
|---|---|---|---|---|
| FORWARD ROTATION, DRIVE | ON | OFF | OFF | ON |
| FORWARD ROTATION, STOP | OFF | OFF | OFF | OFF |
| REVERSE ROTATION, DRIVE | OFF | ON | ON | OFF |
| REVERSE ROTATION, STOP | OFF | OFF | OFF | OFF |
| BRAKE | OFF | OFF | ON | ON |

400

DC MOTOR CONTROL DEVICE AND GAME MACHINE

BACKGROUND

Technical Field

The present invention relates to a DC motor control device for controlling a DC motor and a game machine including such a DC motor control device.

Related Art

In a game machine such as a slot machine or a pinball machine, there are various ways to appeal to a visual sense, auditory sense, or a sensation of a player in order to enhance the interest of the player. In particular, in order to appeal to the visual sense of the player, the game machine may include a movable body, for example, a movable accessory member. A moving range and a moving speed of such a movable body are previously set depending on the performance. Therefore, generally, the movable body is driven by a stepping motor which has an already determined rotation amount per one step, and can control the rotation amount. Then, a processor unit for performance (simply referred to as performance CPU hereafter) which is an example of a host control device, transmits a command to a control circuit of the stepping motor, to rotate the stepping motor by the number of steps corresponding to a moving amount by which the movable body is moved to a specified position in accordance with a gaming state, thereby rotating the stepping motor by the number of steps, and as a result, the movable body is moved to the specified position (for example, see Patent literature 1).

Further, in recent years, the number of movable bodies mounted on the game machine tends to increase in order to enhance the interest of the player. As the number of movable bodies mounted on the game machine increases, the number of motors for driving each movable body also increases. However, the space on the backside of the game machine is limited, and therefore as the number of motors increases, it may be difficult to arrange the motors in the game machine. In particular, since the stepping motor needs to perform excitation control of a plurality of phases, the structure of the stepping motor is complicated, and the size of the stepping motor is correspondingly increased. In addition, the stepping motor is relatively expensive. Therefore, it is undesirable to increase the number of stepping motors.

In addition, in order to enhance the interest of the player, a large movable accessory member may be mounted on the game machine. In order to drive such a movable accessory member, a motor having a high torque is needed. However, in order to increase the torque of the stepping motor, there is no choice but to increase the size of the stepping motor itself, and as a result, it may become more difficult to secure an arrangement space.

On the other hand, there is a DC motor as one type of motor which is generally available. The DC motor is inexpensive compared to the stepping motor and can be smaller than the stepping motor to exert the same torque. Therefore, a technique has been proposed for moving the movable body to a desired movement destination using rotational angle sensors that output detection signals every time the DC motor rotates by a certain rotational angle together with the DC motor (for example, see Patent literature 2).

CITATIONS LIST

Patent Literature

Patent literature 1: Japanese Laid-open Patent Publication No. 2009-247833

Patent literature 2: Japanese Laid-open Patent Publication No. 2014-73024

SUMMARY

In a game machine, when the movable accessory member is driven by the motor, a gear may be disposed between a rotary shaft of the motor and the movable accessory member, so that a driving force of the motor is transmitted to the movable accessory member via the gear in some cases. In this case, the gear ratio is appropriately set according to, for example, the torque of the motor, the weight of the movable accessory member and the moving speed of the movable accessory member.

As described in Patent literature 2, when the DC motor is used for driving the movable accessory member, and a rotational angle sensor such as a rotary encoder is used for measuring the rotation amount of the DC motor, in order to measure the moving amount of the movable accessory member, the moving amount of the movable accessory member is different when the gear ratio is different even when the rotation amount of the DC motor is the same. Depending on the gear ratio and the range of movement of the movable accessory member, the range of the number of steps indicating the rotation amount of the DC motor may be very large. As the range that can be taken by the number of steps is larger, a circuit scale of the motor control circuit is large in order to manage the number of steps, which is undesirable.

Therefore, a DC motor control device and a game machine according to one or more embodiments of the present invention is capable of suppressing a circuit scale even when a management range of the rotation amount of the DC motor to be controlled is large.

According to an aspect of the present invention, a DC motor control device that controls a DC motor is provided. The DC motor control device includes: a communication circuit configured to receive a control command specifying a target rotation amount for the DC motor; a sensor interface configured to receive a detection signal from a rotational angle sensor that outputs the detection signal every time the DC motor rotates by a certain rotational angle; a step counter that outputs a count signal every time the detection signal has been received a certain number of times; a controller that, based on the number of times the count signal is received, determines a step count indicating the total amount of rotation from the start of the rotation of the DC motor, and generates a control signal that controls the DC motor in accordance with the step count and the target rotation amount; and a drive signal generation circuit that generates a drive signal that rotates the DC motor in accordance with the control signal, and outputs the drive signal.

In the DC motor control device, the control command may include information indicating the certain number of times, and the step counter sets the certain number of times based on the information.

Further, in the DC motor control device, the controller may set the certain number of times, so that the number of times of reception of the count signal corresponding to the total rotation amount of the DC motor when the movable body driven by the DC motor moves from one end to the other end of a movable range of the movable body is equal to or less than a certain upper limit value.

Further, according to another aspect of the present invention, a game machine is provided. The game machine includes: a game machine main body; a movable body movably disposed on a front surface of the game machine main body; a DC motor that drives the movable body; a rotational angle sensor that outputs a detection signal every time the DC motor rotates by a certain rotational angle; a DC motor control device that controls the DC motor; and a performance controller that controls a performance in accordance with a gaming state. In the game machine, the performance controller generates a control command for specifying a target rotation amount of the DC motor corresponding to a moving distance from the current position of the movable body to the movement destination in accordance with the gaming state, and transmits the control command to the DC motor control device.

The DC motor control device includes a communication=circuit configured to receive a control command, a sensor interface configured to receive a detection signal from the rotational angle sensor, a step counter that outputs a count signal every time the detection signal has been received a certain number of times; a controller that, based on the number of times the count signal is received, determines a step count indicating the total amount of rotation from the start of the rotation of the DC motor, and generates a control signal that controls the DC motor in accordance with the step count and the target rotation amount; and a drive signal generation circuit that generates a drive signal that rotates the DC motor in accordance with the control signal, and outputs the drive signal.

The DC motor control device and the game machine according to one or more embodiments of the present invention may have an effect that the circuit scale can be suppressed even when a management range of the rotation amount of the DC motor to be controlled is large.

DETAILED DESCRIPTION

Hereinafter, a DC motor control device according to an embodiment of the present invention will be described with reference to the drawings.

When a control command for specifying a target rotation amount and a target rotation speed of a DC motor for driving a movable body such as a movable accessory member of a game machine is received from a host control device, the DC motor control device rotates the DC motor at the target rotation speed. Then, based on a detection signal from a rotational angle sensor that outputs a detection signal every time the DC motor is rotated by a certain angle, and under control of the control command, the DC motor control device counts the number of steps indicating the total amount of rotation from the start of the rotation of the DC motor, and makes the DC motor stop when the number of steps reaches the target rotation amount. As a result, the DC motor control device can move the movable body driven by the DC motor to a movement destination in accordance with the target rotation amount at a speed corresponding to the target rotation speed. Then, every time the detection signal has been received from the rotational angle sensor by the number of times corresponding to the sampling rate specified by the control command, the DC motor control device increments the number of steps by 1, thereby narrowing a range that can be taken by the number of steps, to suppress an increase of a circuit scale.

Figure 1A:
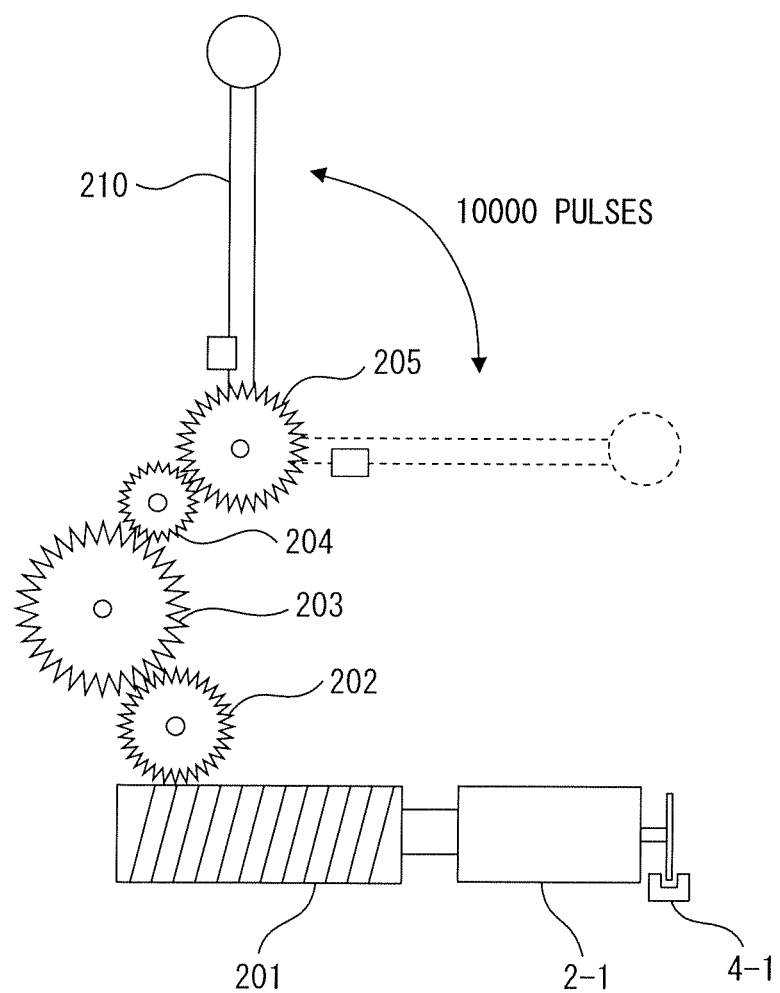
FIG. 1A is a view illustrating an outline arrangement of a DC motor and a movable body when the DC motor to be controlled by a DC motor control device according to an embodiment of the present invention drives the movable body via gears having mutually different gear ratios.
Figure 1B:
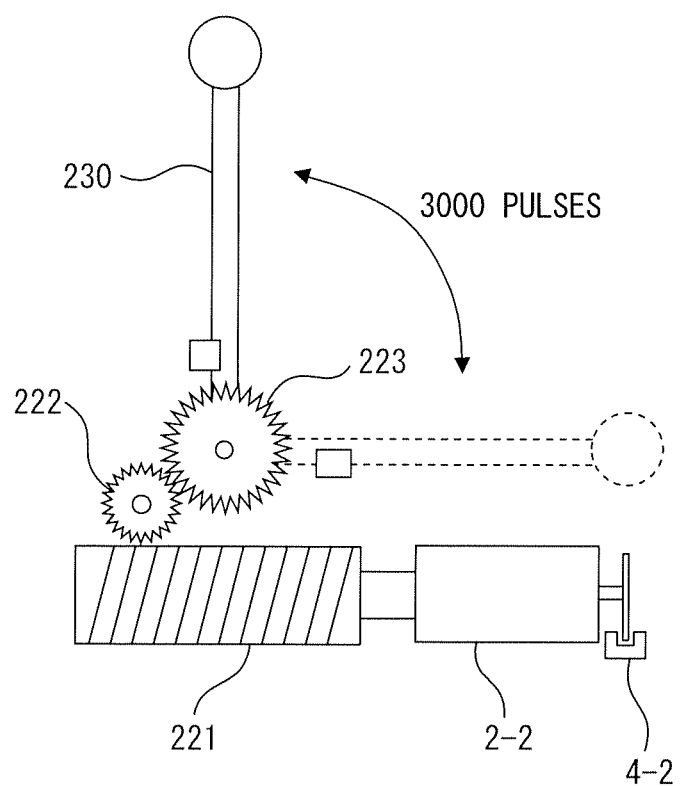
FIG. 1B is a view illustrating an outline arrangement of the DC motor and the movable body when the DC motor to be controlled by the DC motor control device according to an embodiment of the present invention drives the movable body via gears having different gear ratios.

With reference to FIGS. 1A and 1B, explanation will be given for a case in which the number of steps in accordance with the target rotation amount of the DC motor is suppressed by setting the sampling rate. FIGS. 1A and 1B are views illustrating an outline arrangement of the DC motor and the movable body when the DC motor to be controlled by the DC motor control device according to an embodiment of the present invention drives the movable body via gears having mutually different gear ratios. In an example illustrated in FIG. 1A, the rotation from the DC motor 2-1 is transmitted to a gear 205 fixedly attached to one end of a movable body 210 via a worm gear 201 and gears 202 to 204. The movable body 210 is rotatably supported by a rotary shaft of the gear 205. Therefore, in accordance with the rotation of the gear 205, the movable body 210 rotates and moves until a longitudinal direction of the movable body 210 is directed from a horizontal direction to a vertical direction. Further, a rotary encoder 4-1 is attached to the rotary shaft of the DC motor 2-1, and outputs a detection signal every time the DC motor 2-1 rotates by a certain angle. In the example illustrated in FIG. 1A, the gear ratio by the worm gear 201 and the gears 202 to 205 is relatively low, and therefore pulses of detection signals of 10000 times are outputted from the rotary encoder 4-1 until the longitudinal direction of the movable body 210 is directed from the horizontal direction to the vertical direction.

On the other hand, in the example illustrated in FIG. 1B, the rotation from the DC motor 2-2 is transmitted to a gear 223 fixedly attached to one end of the movable body 230 via a worm gear 221 and a gear 222. Then, the movable body 230 is rotatably supported by the rotary shaft of the gear 223. Therefore, in accordance with the rotation of the gear 223, the movable body 230 rotates and moves in accordance with the rotation of the gear 223 until the longitudinal direction of the movable body 230 is directed from the horizontal direction to the vertical direction. Further, a rotary encoder 4-2 is attached to the rotary shaft of the DC motor 2-2, and outputs a detection signal every time the DC motor 2-2 rotates by a certain angle. In the example illustrated in FIG. 1B, the gear ratio by the worm gear 221 and the gears 222 and 223 is relatively high, and therefore pulses of detection signals of 3000 times are outputted from the rotary encoder 4-2 until the longitudinal direction of the movable body 230 is directed from the horizontal direction to the vertical direction.

Therefore, for example, in the example illustrated in FIG. 1A, by setting the sampling rate to ¼, the DC motor control device suppresses the number of steps to 2500 (=10000/4) over an entire movement range of the movable body 210. On the other hand, in the example illustrated in FIG. 1B, even when the sampling rate is set to 1, the DC motor control device can set the number of steps to 3000 over the entire movement range of the movable body 230. In this manner, by setting the sampling rate to be higher as the target rotation amount of the DC motor corresponding to the entire movement range of the movable body becomes larger, the DC motor control device can suppress the range that can be taken by the number of steps.

Figure 2:
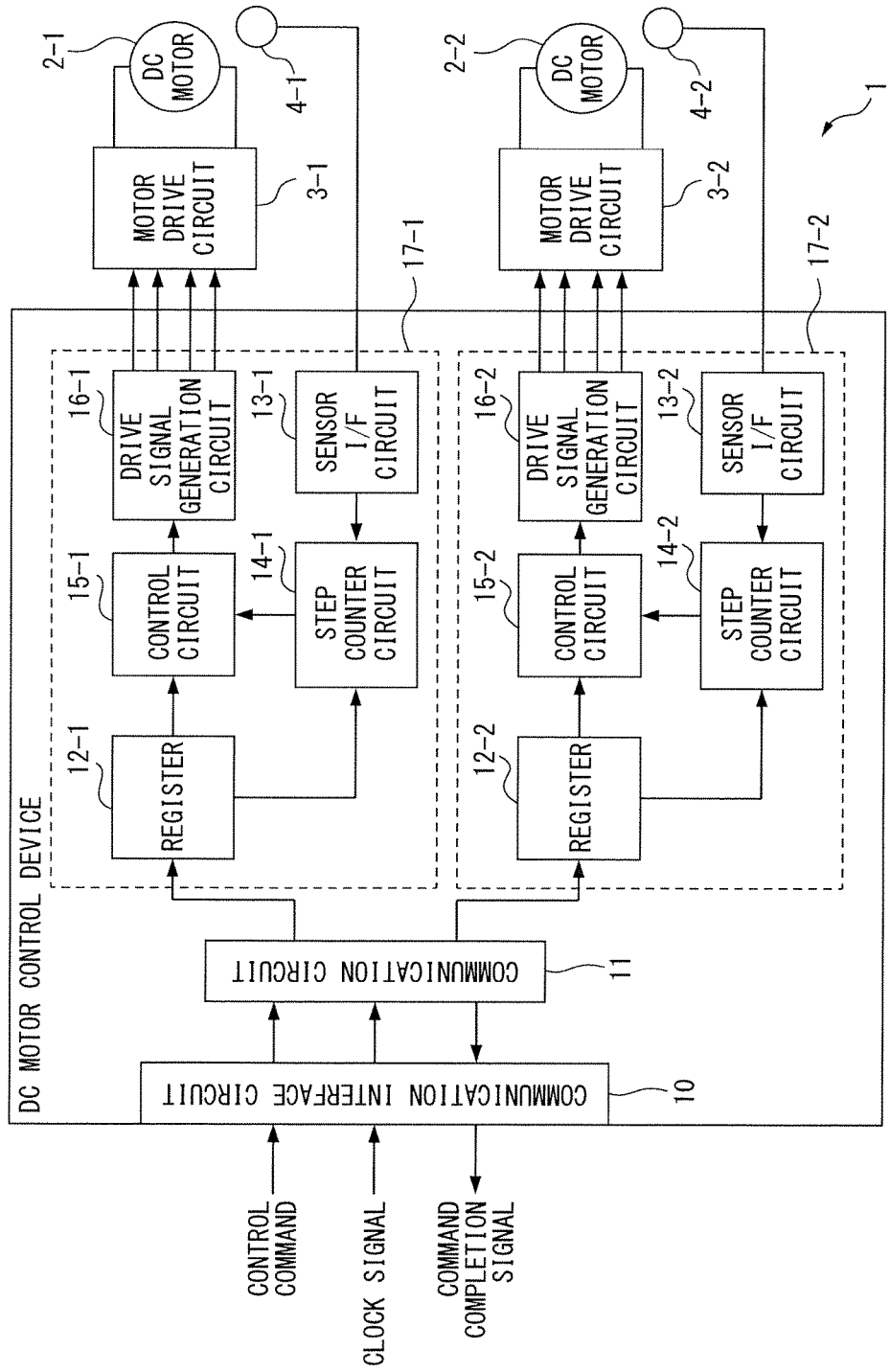
FIG. 2 is a schematic block diagram of the DC motor control device according to a first embodiment of the present invention.

FIG. 2 is a schematic block diagram of the DC motor control device according to a first embodiment of the present invention. As illustrated in FIG. 2, the DC motor control device 1 includes a communication interface circuit 10, a communication circuit 11, two registers 12-1 and 12-2, two sensor interface circuits 13-1 and 13-2, two step counter circuits 14-1 and 14-2, two control circuits 15-1 and 15-2, and two drive signal generation circuits 16-1 and 16-2.

These units of the DC motor control device 1 may be mounted on a circuit board (not illustrated) as separate circuits, respectively, or may be mounted on the circuit board as an integrated circuit in which these units are integrated. Further, a register 12-1, a sensor interface circuit 13-1, a step counter circuit 14-1, a control circuit 15-1 and a drive signal generation circuit 16-1 are included in a drive unit 17-1, and are used for driving the DC motor 2-1. On the other hand, a register 12-2, a sensor interface circuit 13-2, a step counter circuit 14-2, a control circuit 15-2 and a drive signal generation circuit 16-2 are included in a drive unit 17-2, and are used for driving the DC motor 2-2.

The DC motor control device 1 controls the DC motor 2-1 by the drive unit 17-1 or controls the DC motor 2-2 by the drive unit 17-2 in accordance with the control command received from the host control device. Specifically, in accordance with a channel flag specified by the control command, the DC motor control device 1 determines whether the DC motor to be driven is the DC motor 2-1 or the DC motor 2-2, i.e., whether the drive unit to be controlled based on the control command is the drive unit 17-1 or the drive unit 17-2. Then, the DC motor control device 1 rotates the DC motor to be driven at the target rotation speed specified by the control command. In this embodiment, the DC motor control device 1 generates drive signals by a pulse width modulation (PWM) method, for switching ON/OFF of the supply of the current to the DC motor 2-1 or the DC motor 2-2. Then, in accordance with the control command, the DC motor control device 1 supplies the generated drive signals to the motor drive circuit 3-1 for supplying the current to the DC motor 2-1 or the motor drive circuit 3-2 for supplying the current to the DC motor 2-2, thereby controlling the rotation speed of the DC motor 2-1 or the DC motor 2-2. Then, every time the rotary shaft (not illustrated) of the DC motor 2-1 rotates by the certain angle, the DC motor control device 1 receives the detection signal indicating that the DC motor has rotated by a certain angle, from the rotary encoder 4-1 which checks the rotation amount of the DC motor 2-1, and counts the number of steps indicating the total rotation amount from the start of the rotation of the DC motor 2-1, by counting the number of reception times of the detection signals corresponding to the sampling rate. Likewise, every time the rotary shaft (not illustrated) of the DC motor 2-2 rotates by a certain angle, the DC motor control device 1 receives the detection signal indicating that the DC motor has rotated by the certain angle, from the rotary encoder 4-2 which checks the rotation amount of the DC motor 2-2, and counts the number of steps indicating the total rotation amount from the start of the rotation of the DC motor 2-2, by counting the number of times of the reception of the detection signals corresponding to the sampling rate. Regarding the DC motor 2-1 or the DC motor 2-2, when the number of steps reaches the target rotation amount specified by the control command, the DC motor 2-1 or the DC motor 2-2 is stopped by the DC motor control device 1.

Each unit included in the drive unit 17-1 and each unit included in the drive unit 17-2 may have the same configuration and the same function. Further, the motor drive circuit 3-1 for driving the DC motor 2-1 and the motor drive circuit 3-2 for driving the DC motor 2-2 may have the same configuration and the same function. Further, the rotary encoder 4-1 and the rotary encoder 4-2 may have the same configuration and the same function. Therefore, in the following description, each unit included in the drive unit 17-1, the motor drive circuit 3-1 and the rotary encoder 4-1 will be described, and each unit included in the drive unit 17-2, the motor drive circuit 3-2 and the rotary encoder 4-2 will not be described in detail.

Figures 3, 4:
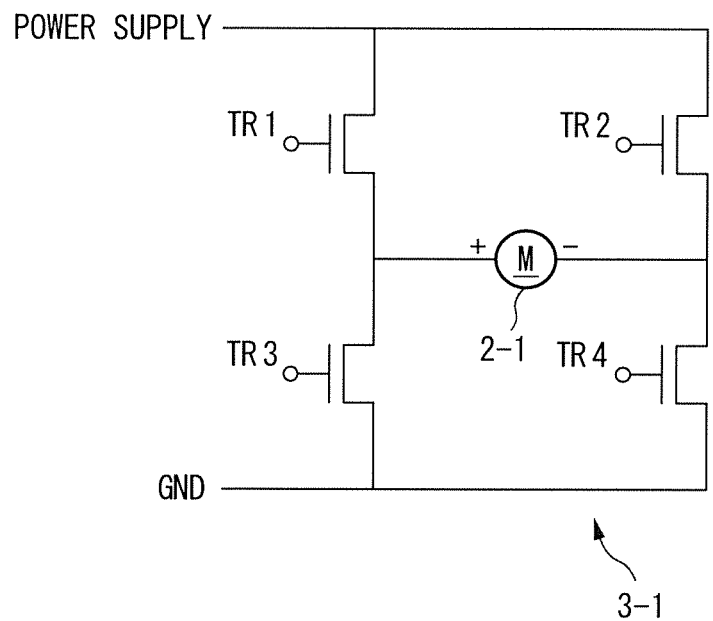
FIG. 3 is a circuit diagram of a motor drive circuit.
FIG. 4 is a view illustrating an example of a table indicating the relationship between the drive signals applied to each switch of the motor drive circuit and rotation directions of the DC motor.

FIG. 3 is a circuit diagram of the motor drive circuit 3-1. The motor drive circuit 3-1 includes four switches TR 1 to TR 4. Each switch can be, for example, a transistor or a field-effect transistor. Of these switches, two switches TR 1 and TR 3 are connected in series between a power supply and the ground. Likewise, two switches TR 2 and TR 4 are connected in series between the power supply and the ground. The positive terminal of the DC motor 2-1 is connected between the switches TR 1 and TR 3, while the negative terminal of the DC motor 2-1 is connected between the switches TR 2 and TR 4. The switch terminals of the switches TR1 to TR4 (for example, corresponding to base terminals when the switches TR1 to TR4 are transistors, and corresponding to the gate terminals when the switches TR1 to TR4 are field effect transistors) are respectively connected to the drive signal generation circuit 16-1. The drive signals from the drive signal generation circuit 16-1 are inputted to the switch terminals of the switches TR 1 to TR 4.

FIG. 4 is a view illustrating an example of a table illustrating the relationship between the drive signals applied to each switch of the motor drive circuit and rotation directions of the DC motor 2-1.

As illustrated in the table 400, when the DC motor 2-1 is rotated in a forward direction, drive signals set based on a PWM method, having a pulse width corresponding to the rotation speed of the DC motor 2-1, and including a periodic pulse, are applied to the switch terminal of the switch TR 1 and the switch terminal of the switch TR 4. On the other hand, no drive signals are applied to the switch terminal of the switch TR 2 and the switch terminal of the switch TR 3. As a result, a power supply voltage is applied to the positive terminal of the DC motor 2-1 only while the pulse is applied to the switch TR 1 and the switch TR 4, so that the DC motor 2-1 rotates in a forward direction at a speed corresponding to the pulse width.

When the DC motor 2-1 rotates in the forward direction, the drive signal may be applied to one of the switches TR 1 and TR 4 and the other may be always turned on.

On the other hand, when the DC motor 2-1 is rotated in a reverse direction, the drive signals set based on a PWM method, having a pulse width corresponding to the rotation speed of the DC motor 2-1, and including a periodic pulse, are applied to the switch terminal of the switch TR 2 and the switch terminal of the switch TR 3. On the other hand, no drive signals are applied to the switch terminal of the switch TR 1 and the switch terminal of the switch TR 4. As a result, the power supply voltage is applied to the negative terminal of the DC motor 2-1 only while the pulse is applied to the switch TR 2 and the switch TR 3, and therefore the DC motor 2-1 rotates in the reverse direction at a speed corresponding to the pulse width.

When the DC motor 2-1 rotates in the reverse direction, the drive signal may be applied to one of the switches TR 2 and TR 3, and the other may be always turned on.

Further, when braking is applied to the DC motor 2-1, the switch terminal of the switch TR 3 and the switch terminal of the switch TR 4 are turned on, and the switch terminal of the switch TR 1 and the switch terminal of the switch TR 2 are turned off.

Further, when the DC motor 2-1 is not driven, the switch terminal of each switch is turned off.

The rotary encoder 4-1 is an example of the rotational angle sensor, and may be an optical rotary encoder for example. The rotary encoder 4-1 has, for example, a disc attached to the rotary shaft of the DC motor 2-1 having a plurality of slits along a circumferential direction around the rotary shaft of the DC motor 2-1, and a light source and a light receiving element disposed to face each other with the disc sandwiched therebetween. Then, every time any one of the slits is positioned between the light source and the light receiving element, the light from the light source reaches the light receiving element, so that the rotary encoder 4-1 outputs pulsed detection signals. As a result, the rotary encoder 4-1 outputs the detection signals to the DC motor control device 1 every time the DC motor 2-1 rotates by a certain angle. For example, by providing 50 slits in the disc along the circumferential direction around the rotary shaft of the DC motor 2-1, the rotary encoder 4-1 outputs 50 detection signals while the rotary shaft of the DC motor 2-1 carries out one rotation.

In order to detect a rotation direction of the DC motor 2-1, the rotary encoder 4-1 has two rows of slits arranged along the circumferential direction around the rotary shaft of the DC motor 2-1 as concentric circles. The number of slits included in each row is the same, and light emitting elements and light receiving elements are provided for each slit row. Further, each slit is formed so that the position of each slit in the row closer to a center is shifted in the circumferential direction by half of the width of the slit relative to the position of the corresponding slit in the row far from the center. Thereby, depending on the rotation direction of the DC motor 2-1, the timing at which the light receiving elements corresponding to the slit row closer to the center output the detection signals, and the timing at which the light receiving elements corresponding to the slit row far from the center detect the detection signals are different from each other, and therefore the DC motor control device 1 can identify the rotation direction of the DC motor 2-1 according to the difference in timing.

Each unit of the DC motor control device 1 will be described below.

The communication interface circuit 10 and the communication circuit 11 are examples of the communication units. Then, the communication interface circuit 10 connects, for example, the DC motor control device 1 to the host control device. The host control device is, for example, the performance CPU in the game machine on which the DC motor control device 1 is mounted. Then, the communication interface circuit 10 receives the control command having a plurality of bits to be serially transmitted from the host control device. Further, in order to analyze the control command, the communication interface circuit 10 may also receive a clock signal from the host control device, for synchronizing with each of the plurality of bits included in the control command. Then, the communication interface circuit 10 transfers the received control command and clock signal to the communication circuit 11. Further, the communication interface circuit 10 transmits a command completion signal or the like received from the communication circuit 11 to the host control device.

The communication circuit 11 analyzes the control command and judges which of the DC motor 2-1 or the DC motor 2-2 is controlled by this command. When the control command is the command for controlling the DC motor 2-1, the communication circuit 11 writes the operation information included in the control command into the register 12-1. On the other hand, when the control command is the command for controlling the DC motor 2-2, the communication circuit 11 writes the operation information included in the control command into the register 12-2.

The control command includes, for example, the operation information for specifying the operation of the DC motor 2-1 or 2-2, such as the target rotation amount of the DC motor 2-1 or 2-2 corresponding to the moving amount of the movable body driven by the DC motor 2-1 or 2-2.

The clock signal can be, for example, a signal having rectangular pulses for every certain number of bits in the control command.

Figure 5:
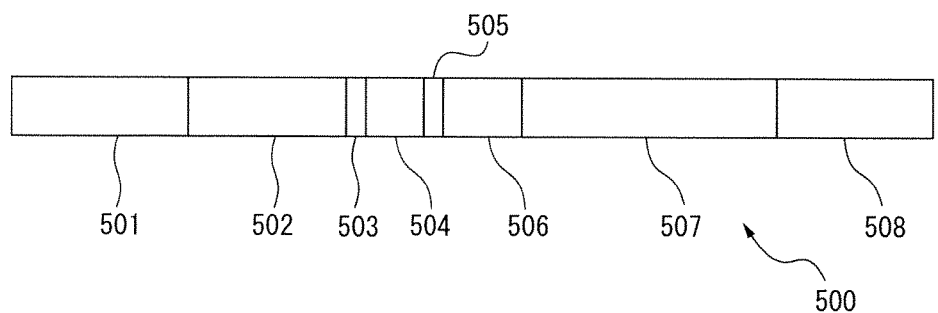
FIG. 5 is a view illustrating an example of a format of a control command including operation information.

FIG. 5 is a view illustrating an example of a format of the control command including operation information. As illustrated in FIG. 5, the control command 500 including the operation information has, in order from the head, a START flag 501, a device address 502, a channel flag 503, sampling information 504, a rotation direction flag 505, speed data 506, rotation amount data 507, and END flag 508. Among them, the sampling information 504, the rotation direction flag 505, the speed data 506, and the rotation amount data 507 correspond to the operation information. Further, the control command 500 may include a 1-bit spacer having a value of, for example, '0' between adjacent flags, addresses and data.

The START flag 501 is a bit string indicating that it is the head of the control command 500, and in this embodiment, it is a bit string of 9 consecutive bits each having a value of '1'. The START flag 501 has only to be a bit string that does not coincide with any other bit string in the control command 500.

The device address 502 is identification information for specifying the DC motor control device to be controlled by the control command 500, and is indicated by a bit string of 8 bit length in this embodiment. The communication circuit 11 judges, for example, whether or not the device address 502 coincides with identification address which is separately received from the host control device, or is previously set, and in case of coincidence, it is judged that the DC motor control device 1 is the device to be controlled by the control command 500. On the other hand, when the device address 502 does not coincide with the identification address, the DC motor control device 1 is not the device to be controlled by the control command 500. Therefore, the communication circuit 11 may discard the control command 500.

The channel flag 503 is a 1-bit flag for identifying the DC motor (and the drive unit) to be controlled by the control command 500. In this embodiment, when the channel flag 503 is '0', the control command includes the operation information of the DC motor 2-1. When the channel flag 503 is '1', the control command includes the operation information of the DC motor 2-2.

The sampling information 504 is a 3-bit length bit string indicating the sampling rate for the reception of the detection signals from the rotary encoder 4-1 or the rotary encoder 4-2, and takes a value from '0' to '3'. In this embodiment, when the sampling information 504 is '0', it indicates that the sampling rate is 1, i.e., the number of steps is incremented by 1 every time the detection signal has been received. Further, when the sampling information 504 is '1', it indicates that the sampling rate is ½, i.e., the number of steps is incremented by 1 every time the detection signal is received twice. Likewise, when the sampling information 504 is '2', it indicates that the sampling rate is ¼, i.e., the number of steps is incremented by 1 every time the detection signal is received four times. When the sampling information 504 is '3', it indicates that the sampling rate is ⅛, i.e., the number of steps is incremented by 1 every time the detection signal is received eight times.

The rotation direction flag 505 is a 1-bit flag indicating the rotation direction of the DC motor 2-1 or the DC motor 2-2. In this embodiment, when the rotation direction flag 505 is '0', the DC motor control device 1 rotates the DC motor 2-1 or the DC motor 2-2 in a normal direction, whereas when the rotation direction flag 505 is '1', the DC motor control device 1 reversely rotates the DC motor 2-1 or the DC motor 2-2.

The speed data 506 indicates the target rotation speed of the DC motor 2-1 or the DC motor 2-2. In this embodiment, the speed data 506 is a bit string of 4 bit length, which is a value of one of '0' to '15'. When the speed data 506 is '0', braking is applied to the DC motor 2-1 or the DC motor 2-2, i.e., it indicates that the brake signal is outputted for turning on the switches TR 3 and TR 4 of the motor drive circuit 3-1 or 3-2. When the speed data 506 is '1' to '15', it indicates that the DC motor 2-1 or the DC motor 2-2 is rotated at the target rotation speed set by the value of the speed data 506. In this example, the larger the value of the speed data 506 is, the faster the target rotation speed becomes.

The rotation amount data 507 indicates the target rotation amount of the DC motor 2-1 or the DC motor 2-2. In this embodiment, the rotation amount data 507 is a bit string of 13 bit length. Then, the rotation amount data 507 indicates the target rotation amount by the number of steps. In other words, a value obtained by multiplying the value indicated by the rotation amount data 507, by a central angle between the adjacent slits of the rotary encoders 4-1 and 4-2, and multiplying the result by a reciprocal of the sampling rate indicated by the sampling information 504, is an actual target rotation amount of the DC motor 2-1 or the DC motor 2-2.

The END flag 508 is a bit string indicating that it is a terminal end of the control command 500. The END flag 508 has only to be a bit string that does not coincide with the START flag and another bit string included in the control command.

Further, when one command set stored in the register 12-1 is executed for the DC motor 2-1, i.e., when the DC motor 2-1 is rotated by the target rotation amount included in this command set, the communication circuit 11 may output the command completion signal indicating that this command is executed, to the host control device via the communication interface circuit 10. Likewise, when one command set stored in the register 12-2 is executed for the DC motor 2-2, the communication circuit 11 may output the command completion signal indicating that this command is executed, to the host control device via the communication interface circuit 10. The command completion signal may be, for example, the signal including a plurality of bits for identifying the DC motor 2-1 or the DC motor 2-2, and one bit indicating completion of command.

The register 12-1 has a so-called first-in, first-out (FIFO) type memory circuit having a storage capacity capable of storing at least one piece of operation information of the DC motor 2-1. The memory circuit included in the register 12-1 is constituted by, for example, a volatile readable/writable semiconductor memory circuit.

The register 12-1 stores the operation information written by the communication circuit 11, and deletes the operation information when the operation information is read by the control circuit 15-1.

The sensor interface circuit 13-1 includes an interface circuit for receiving the detection signals from the rotary encoder 4-1. The sensor interface circuit 13-1 outputs the detection signals to the step counter circuit 14-1, every time it receives the detection signals.

The step counter circuit 14-1 outputs a count signal to the control circuit 15-1 every time it receives the detection signals of the number of times corresponding to the sampling rate indicated by the sampling information included in the control command.

Figure 6:
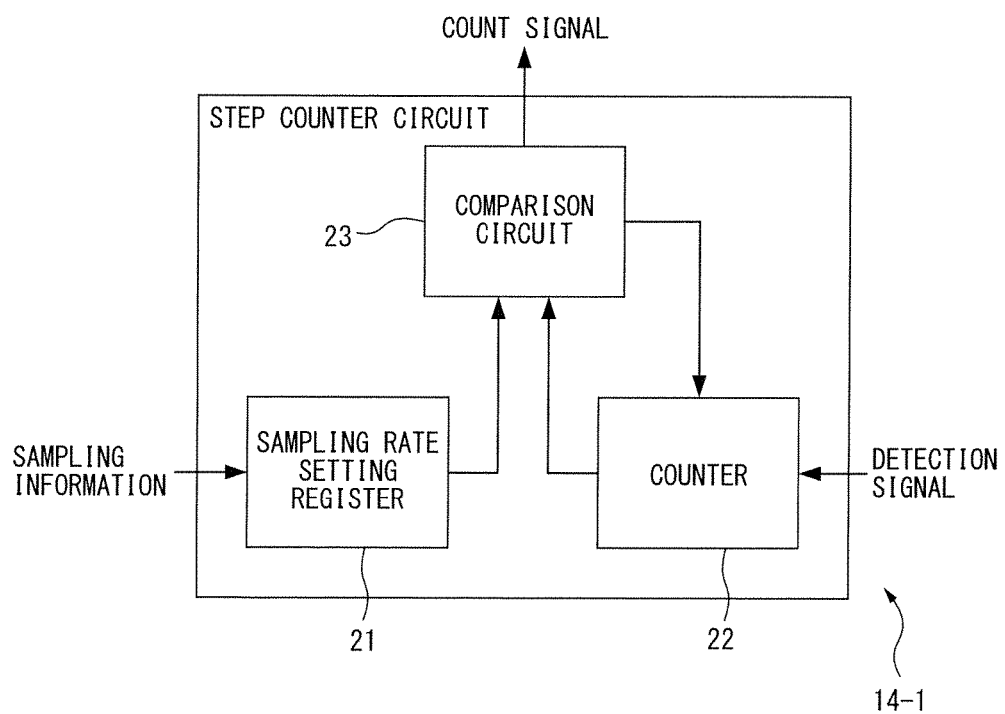
FIG. 6 is a block diagram of the step counter circuit.

FIG. 6 is a block diagram of the step counter circuit 14-1. The step counter circuit 14-1 includes a sampling rate setting register 21, a counter 22, and a comparison circuit 23.

The sampling rate setting register 21 reads the sampling information included in the oldest operation information out of the operation information stored in the register 12-1, and sets the sampling rate indicated by this sampling information. Then, the sampling rate setting register 21 outputs a count threshold value which is the reciprocal of the set sampling rate, to the comparison circuit 23. In other words, when the sampling rate is 1/n (n is an integer of 1 or more), the count threshold value is n.

The counter 22 increments the count value indicating the number of times of reception of the detection signals by one, every time the counter 22 receives the detection signal from the sensor interface circuit 13-1. Then, the counter 22 outputs the incremented count value to the comparison circuit 23, every time the counter 22 receives the detection signal from the sensor interface circuit 13-1. Further, when the reset signal is received from the comparison circuit 23, the counter 22 resets the count value to 0.

The comparison circuit 23 compares the count value with the count threshold value, every time the comparison circuit 23 receives the count value from the counter 22. Then, the comparison circuit 23 outputs the count signal to the control circuit 15-1 for indicating that the number of steps has increased by 1 every time the count value reaches the count threshold value, and outputs the reset signal to the counter 22. On the other hand, when the count value is less than the count threshold value, the comparison circuit 23 does not output anything in particular.

In this manner, the step counter circuit 14-1 adjusts the number of times of reception of the detection signals needed for outputting one count signal, corresponding to the sampling rate. Therefore, by suitably setting the sampling rate, the maximum value of the number of steps, i.e., the range that can be taken by the value of the number of steps, can be suppressed.

The control circuit 15-1 has, for example, a processor and a nonvolatile memory circuit. The control circuit 15-1 reads the oldest operation information out of the operation information stored in the register 12-1. Then, the control circuit 15-1 refers to the rotation direction flag included in the read operation information and determines the rotation direction of the DC motor 2-1. Further, the control circuit 15-1 determines the duty ratio of the drive signals corresponding to the target rotation speed indicated by the operation information. Then, the control circuit 15-1 notifies the drive signal generation circuit 16-1 of the control signals indicating the rotation direction and the duty ratio.

In order to determine the duty ratio of the drive signals, the control circuit 15-1 determines the duty ratio corresponding to the target rotation speed, for example, by referring to a speed table indicating a correlation between the value of the target rotation speed and the duty ratio, which is previously stored in the memory circuit of its own.

Every time the control command is executed, the control circuit 15-1 counts the number of count signals received from the step counter circuit 14-1 after the DC motor 2-1 starts to rotate by execution of the control command, and sets the total of the counts as the number of steps corresponding to the total rotation amount from the start of rotation of the DC motor 2-1 when executing one control command. Then, the control circuit 15-1 stores the number of steps in the memory circuit.

The control circuit 15-1 compares the target rotation amount included in the operation information of the control command with the number of steps, every time the control circuit 15-1 updates the number of steps. Then, when the number of steps reaches the target rotation amount, the control circuit 15-1 outputs the control signal to the drive signal generation circuit 16-1, for indicating to stop the DC motor 2-1 (for example, indicating to set the duty ratio to 0 or apply the brake), so that the DC motor 2-1 is stopped. As a result, the control circuit 15-1 can rotate the DC motor 2-1 by the target rotation amount.

The drive signal generation circuit 16-1 has, for example, a variable pulse generation circuit capable of changing the width of the pulse to be outputted, and a switch circuit that switches the output of a periodic pulse signal which is a drive signal generated by the variable pulse generation circuit, to one of the switches of the motor drive circuit 3-1. Then, in accordance with the duty ratio notified from the control circuit 15-1, the drive signal generation circuit 16-1 generates the drive signal for driving the DC motor 2-1 based on the PWM method and outputs the drive signal to one of the switches of the motor drive circuit 3-1. The length of one period of the drive signal is, for example, 50 μsec. For example, when the rotation direction notified from the control circuit 15-1 is a forward rotation, the drive signal generation circuit 16-1 outputs the periodic pulse signal to the switches TR 1 and TR 4 of the motor drive circuit 3-1. On the other hand, when the rotation direction reported from the control circuit 15-1 is a reversed rotation, the drive signal generation circuit 16-1 outputs the periodic pulse signal to the switches TR 2 and TR 3 of the motor drive circuit 3-1.

Figure 7:
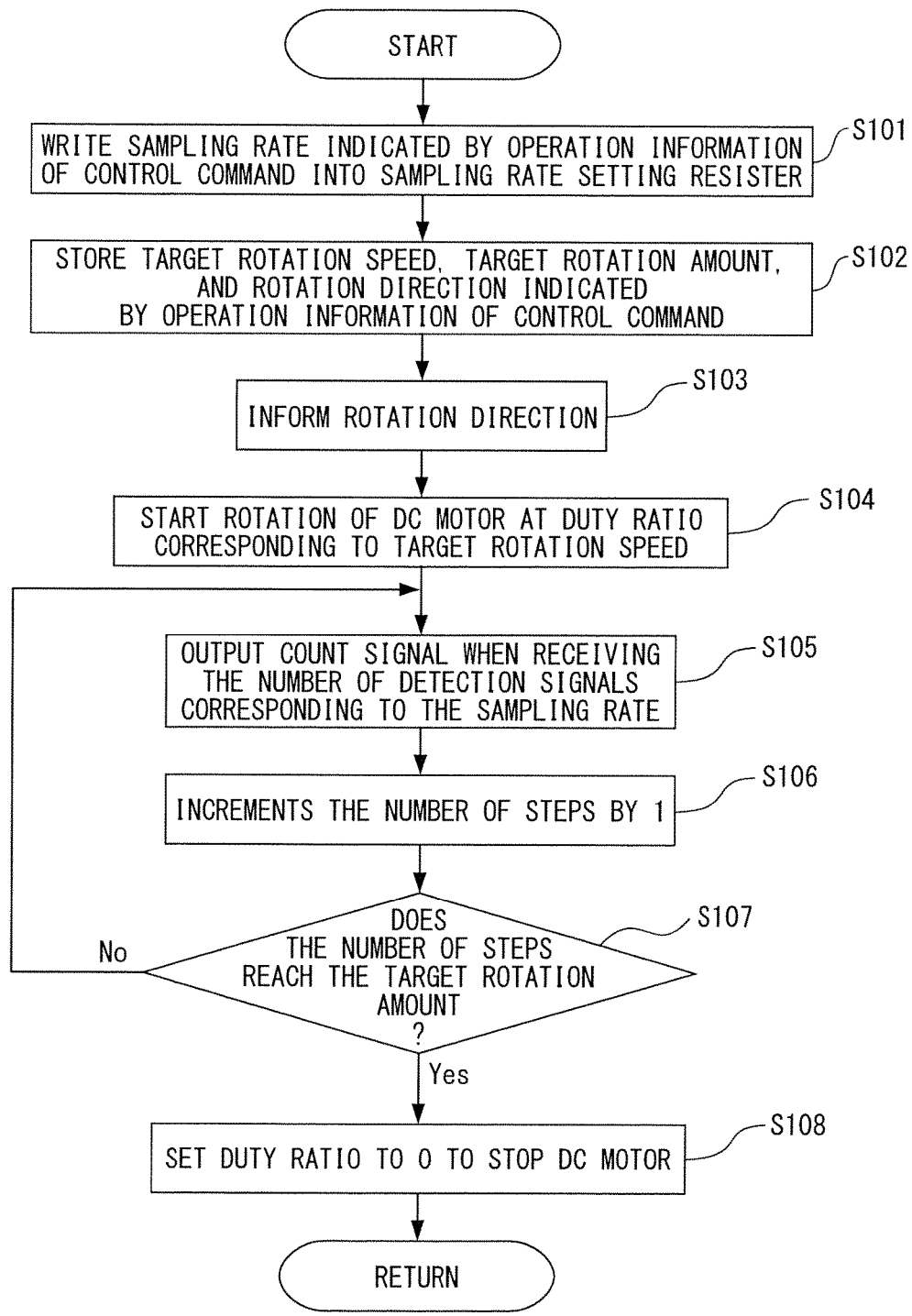
FIG. 7 is an operation flowchart of a DC motor control process.

FIG. 7 is an operation flowchart of a DC motor control process executed by the DC motor control device 1. The DC motor control process is executed every time the DC motor control device 1 receives the control command from the host control device. In the following description, explanation will be given for a case in which the DC motor to be controlled is the DC motor 2-1 driven by the drive unit 17-1. Even when the DC motor to be controlled is the DC motor 2-2 driven by the drive unit 17-2, the DC motor control process is executed based on the same operation flowchart.

The step counter circuit 14-1 reads the operation information stored in the register 12-1 and writes the sampling rate indicated by the sampling information included in the operation information, into the sampling rate setting register 21 (step S101). Further, the control circuit 15-1 reads the operation information stored in the register 12-1, and stores the target rotation speed, the target rotation amount, and the rotation direction flag included in the operation information in the memory circuit of the control circuit 15-1 (step S102). Then, the control circuit 15-1 deletes the operation information from the register 12-1. Further, the control circuit 15-1 resets the number of steps to 0.

The control circuit 15-1 refers to the rotation direction flag included in the operation information to determine the rotation direction of the DC motor 2-1 and notifies the drive signal generation circuit 16-1 of the rotation direction thereof (step S103). Further, the control circuit 15-1 outputs the control signal indicating the duty ratio corresponding to the target rotation speed included in the operation information, to the drive signal generation circuit 16-1 (step S104). The drive signal generation circuit 16-1 generates the drive signal having a pulse width corresponding to the duty ratio, and outputs the drive signal to the motor drive circuit 3-1. As a result, the DC motor 2-1 starts to rotate.

The step counter circuit 14-1 outputs the count signal to the control circuit 15-1, every time the number of the detection signals corresponding to the sampling rate indicated by the operation information have been received from the rotary encoder 4-1 via the sensor interface circuit 13-1 (step S105). The control circuit 15-1 increments the number of steps by 1, every time the control circuit 15-1 receives the count signal from the step counter circuit 14-1 (step S106). Then, the control circuit 15-1 judges whether or not the number of steps reaches the target rotation amount specified by the operation information (step S107). When the number of steps does not reach the target rotation amount (No in step S107), the DC motor control device 1 repeats the process in step S105 and the subsequent steps.

On the other hand, when the number of steps reaches the target rotation amount (Yes in step S107), the control circuit 15-1 outputs the control signal to the drive signal generation circuit 16-1, for indicating to stop the DC motor 2-1 by setting the duty ratio to 0, and makes the DC motor 2-1 stop (step S108). Thereafter, the DC motor control device 1 ends the DC motor control process.

As described above, the DC motor control device controls the rotation amount of the DC motor by determining an actual rotation amount from the start of the rotation of the DC motor using the rotary encoder. At this time, the DC motor control device adjusts the number of times of reception of the detection signals from the rotary encoder, which is needed to increment the number of steps by 1, the step indicating the rotation amount of the DC motor, in accordance with the sampling rate specified by the control command. Therefore, the DC motor control device can suppress the range of values that can be taken by the number of steps, regardless of the moving range of the movable body driven by the DC motor and the gear ratio of the gear provided between the DC motor and the movable body. As a result, the DC motor control device can suppress the increase of the circuit scale.

The DC motor control device of a second embodiment will be described next. In the DC motor control device of the second embodiment, the sampling rate is determined so that the number of steps is equal to or less than the upper limit value when the movable body is actually moved from one end to the other end of its moving range by driving the movable body using the DC motor. When the DC motor control device of the second embodiment is compared to the DC motor control device of the first embodiment, the process by the control circuits 15-1 and 15-2 are partially different. As in the first embodiment, the drive unit 17-1 and the drive unit 17-2 have the same configuration. Therefore, in the following description, explanation will be given for a part different from the process of the first embodiment in the process by the control circuit 15-1, and related parts of other components of the DC motor control device.

When the control command including a sampling rate setting request is received from the host control device via the communication interface circuit 10, the communication circuit 11 refers to the channel flag included in the control command to specify the register into which the control command is written, of the registers 12-1 and 12-2. Then, the communication circuit 11 writes the sampling rate setting request information included in the control command, into the specified register.

Figure 8:
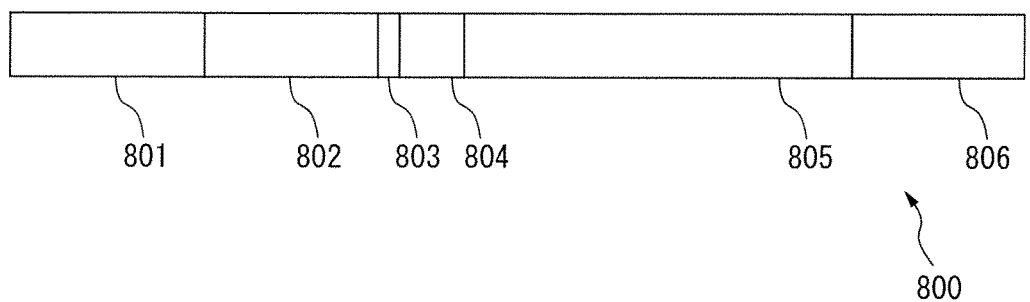
FIG. 8 is a view illustrating an example of a format of the control command including sampling rate setting request information.

FIG. 8 is a view illustrating an example of a format of the control command including a sampling rate setting request information. As illustrate in FIG. 8, a control command 800 including the sampling rate setting request information has, in order from the head, a START flag 801, a device address 802, a channel flag 803, a sampling rate setting request flag 804, a dummy data 805, and an END flag 806. Among them, the sampling rate setting request flag 804 and the dummy data 805 correspond to sampling rate setting request information. Further, the control command 800 may include a 1-bit spacer having a value of, for example, '0' between adjacent flags, addresses and data. The START flag 801, the device address 802, the channel flag 803, and the END flag 806 included in the control command 800 are the same as the START flag, the device address, the channel flag, and the END flag of the control command including the operation information illustrated in FIG. 5. Therefore, the sampling rate setting request flag 804 and the dummy data 805 included in the sampling rate setting request information will be described hereafter.

The sampling rate setting request flag 804 is a bit string of 3 bit length similarly to the sampling information included in the control command 500 that includes the operation information illustrated in FIG. 5. However, the sampling rate setting request flag 804 has a value different from the sampling information, for example, has a value of '7'. Therefore, the control circuits 15-1 and 15-2 can identify whether it is the sampling information or the sampling rate setting request flag that is indicated by the bit string.

The dummy data 805 has a bit length such that the length of the control command 800 is equal to the length of the control command that includes the operation information. Since nothing is set in the dummy data 805, the dummy data 805 may have any value.

When the information read from the register 12-1 is the sampling rate setting request information, the control circuit 15-1 starts sampling rate setting process.

Figure 9:
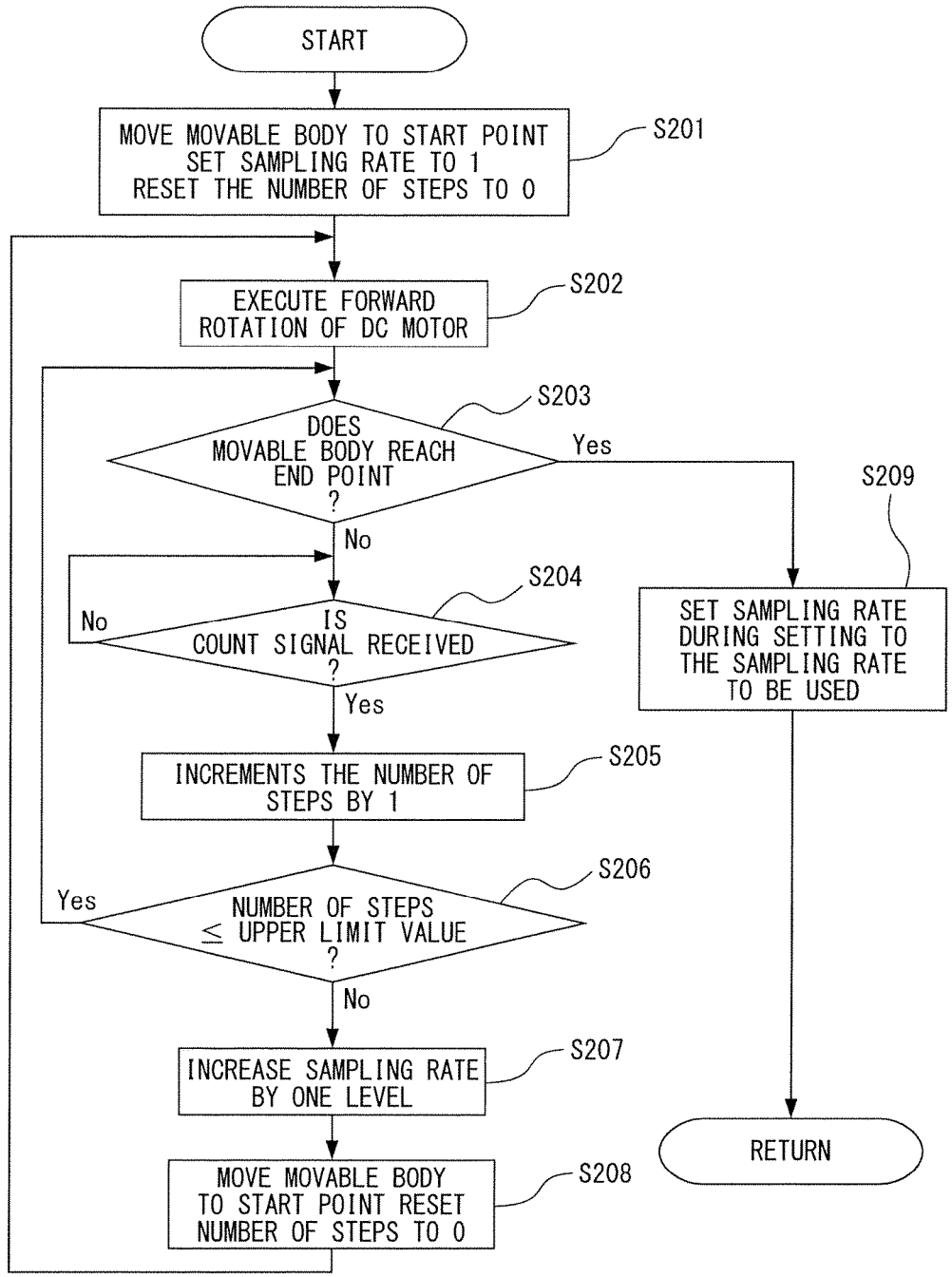
FIG. 9 is an operation flowchart of the sampling rate setting process.

FIG. 9 is an operation flowchart of the sampling rate setting process.

The control circuit 15-1 controls the drive signal generation circuit 16-1 to move the movable body driven by the DC motor 2-1 to one end of the movement range (hereinafter referred to as a start point, for convenience). Further, the control circuit 15-1 resets the sampling rate stored in the sampling rate setting register 21 of the step counter circuit 14-1 to 1 and resets the number of steps indicating the rotation amount of the DC motor 2-1 to 0 (step S201).

When the movable body moves to the start point, the control circuit 15-1 controls the drive signal generation circuit 16-1 so that the DC motor 2-1 rotates forward (step S202). Then, the control circuit 15-1 starts counting the number of steps.

The control circuit 15-1 may detect that the movable body has moved to the start point, for example, by receiving the detection signals from a proximity sensor or the like installed at the start point via the sensor interface circuit 13-1.

The control circuit 15-1 may judge whether or not the movable body has reached the other end (hereinafter referred to as an end point, for convenience) of the movement range (step S203). In this case as well, the control circuit 15-1 may detect that the movable body has moved to the end point, for example by receiving the detection signals from the proximity sensor or the like installed at the end point via the sensor interface circuit 13-1. When the movable body has not reached the end point (No in step S203), the control circuit 15-1 determines whether or not the count signal has been received from the step counter circuit 14-1 (step S204). When the count signal has not been received (No in step S204), the control circuit 15-1 repeats the process in step S204 in step S204. On the other hand, when the count signal has been received (Yes in step S204), the control circuit 15-1 increments the step number by 1 (step S205).

The control circuit 15-1 judges whether or not the number of steps is equal to or less than the upper limit value (for example, 5000) (step S206). The upper limit value of the number of steps is previously set according to the scale, specifications, and the like of the circuit of the control circuit 15-1. When the number of steps is equal to or less than the upper limit value (Yes in step S206), the control circuit 15-1 repeats the process in step S203 and the subsequent steps.

On the other hand, when the number of steps exceeds the upper limit value (No in step S206), the control circuit 15-1 may fail to manage the rotation amount of the DC motor 2-1 corresponding to the entire moving range of the movable body at the currently set sampling rate. Therefore, the control circuit 15-1 increases the sampling rate by one level (step S207). For example, when the current sampling rate is (1/n), the control circuit 15-1 changes the sampling rate to (1/(2n)). Then, the control circuit 15-1 rewrites the sampling rate stored in the sampling rate setting register 21 of the step counter circuit 14-1 to the changed sampling rate.

Further, the control circuit 15-1 controls the drive signal generation circuit 16-1 to move the movable body driven by the DC motor 2-1 to the start point and resets the number of step to 0 (step S208). Thereafter, the control circuit 15-1 repeats the process in step S202 and the subsequent steps.

On the other hand, when the movable body has reached the end point in step S203 (Yes in step S203), since the number of steps for moving the movable body from the start point to the end point is equal to or less than the upper limit value, the control circuit 15-1 can manage the rotation amount of the DC motor 2-1 corresponding to the moving range of the movable body at the currently set sampling rate. Therefore, the control circuit 15-1 sets the sampling rate stored in the sampling rate setting register 21 of the step counter circuit 14-1 to the sampling rate to be used (step S209). Then, the control circuit 15-1 notifies the communication circuit 11 of the sampling rate. The communication circuit 11 generates a sampling rate setting signal including information indicating the set sampling rate and a flag indicating the drive unit 17-1 or the drive unit 17-2. The information indicating the sampling rate can be, for example, the same information as the sampling information in the operation information included in the control command. The communication circuit 11 transmits the sampling rate setting signal to the host control device via the communication interface circuit 10. Then, the control circuit 15-1 terminates the sampling rate setting process.

The control circuit 15-1 may notify the communication circuit 11 of the number of steps when the movable body reaches the end point. Then, the communication circuit 11 may include the number of steps in the sampling rate setting signal. In this case, even when the host control device does not previously know the amount of rotation of the DC motor 2-1 which the movable body driven by the DC motor 2-1 needs to move from one end to the other end of the movement range, the host control device may know the number of steps corresponding to the rotation amount by referring to the sampling rate setting signal. Therefore, when the control command including the operation information is generated, the host control device can determine the target rotation amount using the number of steps included in the sampling rate setting signal.

Further, according to the second embodiment, the sampling rate setting process is executed, so that the sampling rate to be used is registered in the sampling rate setting register 21 of the step counter circuit 14-1. Therefore, in the control command including the operation information, the sampling information may be omitted.

According to a modified example of each of the above-mentioned embodiments, the control circuit may decrease the set sampling rate, when the difference between the target rotation amount specified by the control command and the number of steps from the start of movement of the movable body becomes equal to or less than a certain threshold value (for example, 100). For example, when the set sampling rate is (1/n), the control circuit may set the sampling rate to (1/(n/2)) or 1. Thus, when the movable body approaches the movement destination, the control circuit can more precisely control the rotation amount of the DC motor.

According to another modified example, the control command may include a plurality of target rotation speeds and a switching rotation amount corresponding to each rotation speed. In this case, every time the number of steps reaches any one of the switching rotation amounts, the control circuit sets the rotation speed of the DC motor to the target rotation speed corresponding to the switching rotation amount, and outputs the control signal indicating the duty ratio corresponding to the target rotation speed to the drive signal generation circuit.

According to still another modified example, the number of drive units included in the DC motor control device is not limited to two. The number of drive units of the DC motor control device may be one or three or more.

The DC motor control device according to the embodiment or the modified example described above may be mounted on a game machine such as a pinball machine or a slot machine.

Figure 10:
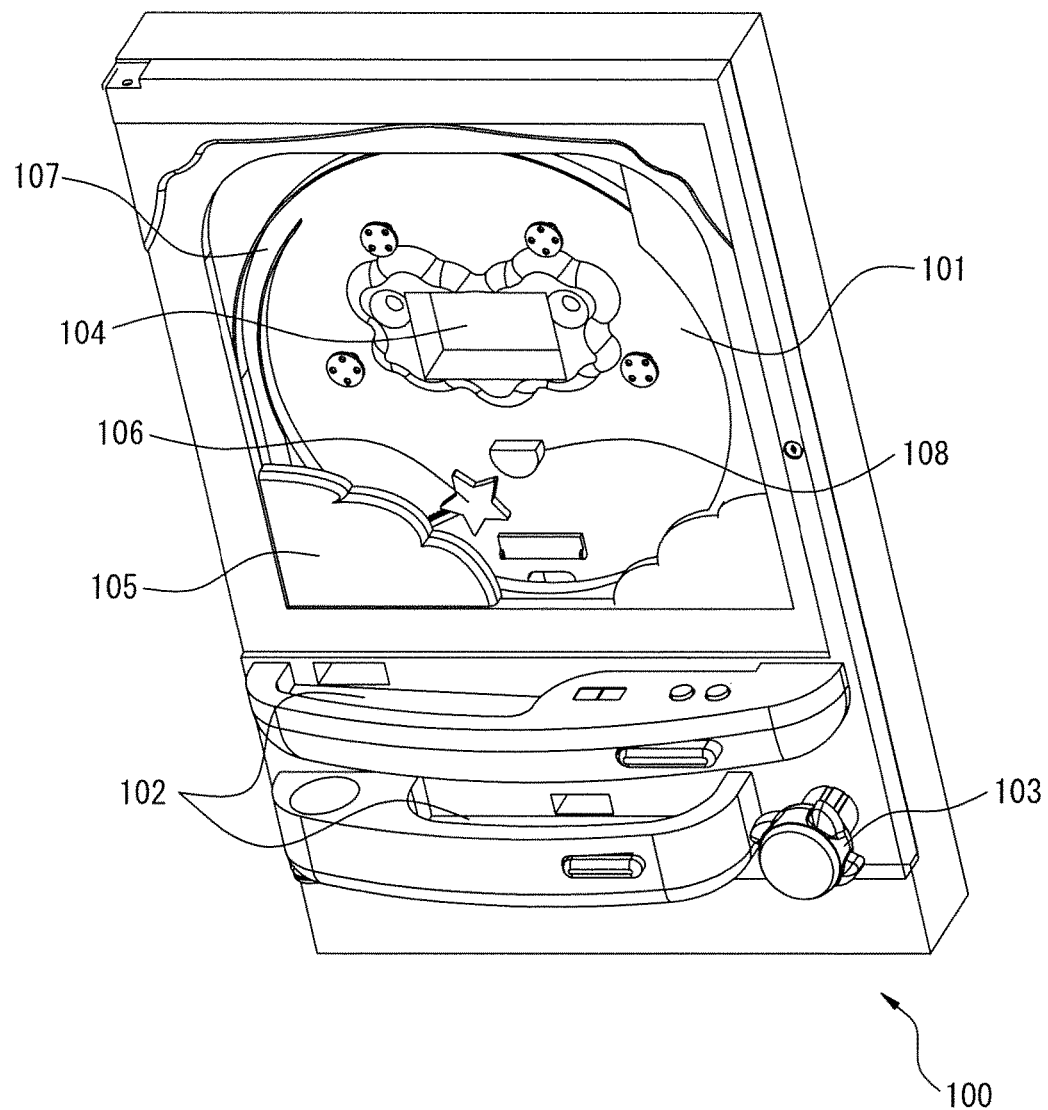
FIG. 10 is a schematic perspective view of a pinball machine including the DC motor control device according to an embodiment of the present invention or a modified example thereof.
Figure 11:
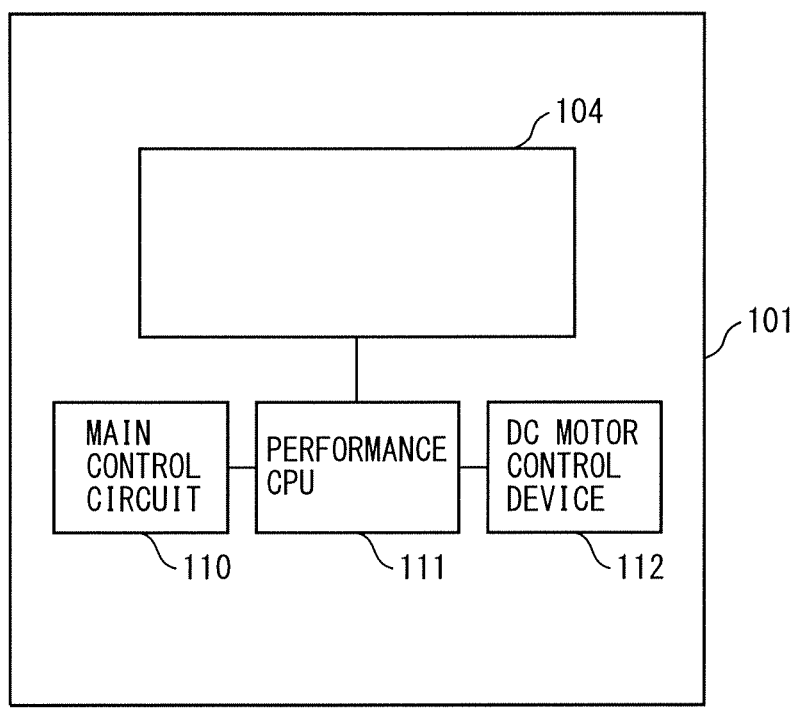
FIG. 11 is a schematic backside view of the pinball machine including the DC motor control device according to an embodiment of the present invention or a modified example thereof.

FIG. 10 is a schematic perspective view of pinball machine 100 including the DC motor control device according to an embodiment of the present invention or a modified example thereof. In addition, FIG. 11 is a schematic backside view of the pinball machine 100. As illustrated in FIG. 10, the pinball machine 100 has a game board 101 which is provided in most of the area from the top to the center of the pinball machine and is a main body of the pinball machine, a ball reception unit 102 disposed in a lower part of the game board 101, an operation unit 103 including a handle, and a display 104 provided substantially at the center of the game board 101.

In addition, the pinball machine 100 includes a fixed accessory member 105 disposed in a lower part of the game board 101 on the front side of the game board 101, and a movable accessory member 106 disposed between the game board 101 and the fixed accessory member 105, for the performance of the game. Further, a rail 107 is disposed on the lateral side of the game board 101. On the game board 101, a large number of obstacle nails (not illustrated) and at least one winning ball member 108 are provided.

The operation unit 103 launches a game ball with a certain force from a launcher (not illustrated) in accordance with an amount of turning of the handle by a player's operation. The launched game ball moves upward along the rail 107 and falls between the large number of obstacle nails. When detecting that the game ball has entered into any one of the winning ball members 108 by a sensor (not illustrated), a main control circuit 110 provided on the backside of the game board 101 delivers a certain prize game balls responding to the winning ball member 108 in which the game balls have entered, to the ball reception unit 102 via a ball delivery device (not illustrated). Further, the main control circuit 110 displays various images on the display 104 via the performance CPU 111 provided on the backside of the game board 101.

The movable accessory member 106 is an example of the movable body that moves in accordance with the gaming state and is driven by a DC motor 125 (see FIGS. 12A to 12C) which is controlled by the DC motor control device 112 of the embodiments of the present invention or the modified examples thereof provided on the backside of the game board 101.

Figure 12A:
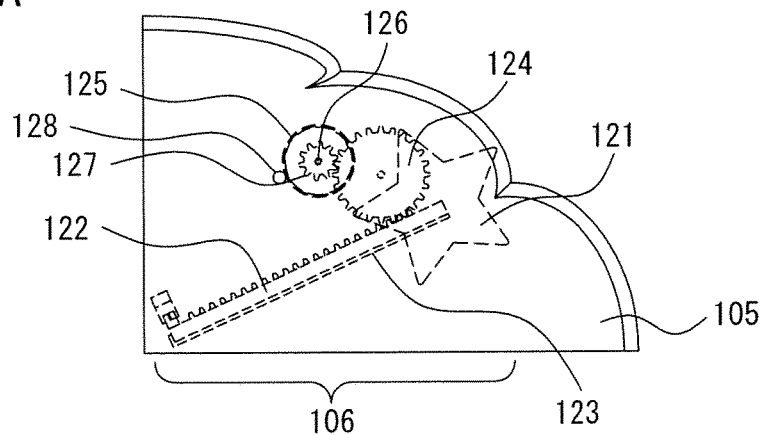
FIG. 12A is a schematic front view of a movable accessory member viewed through a fixed accessory member.
Figure 12B:
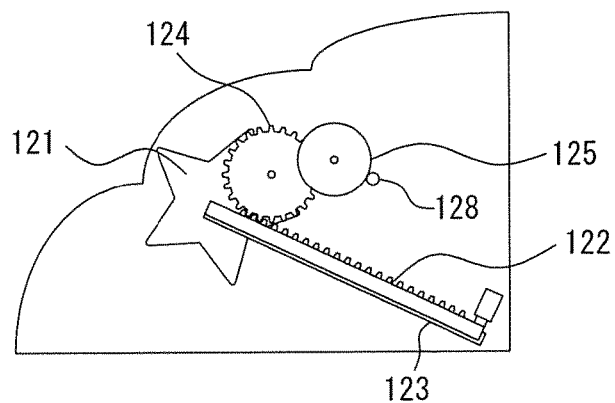
FIG. 12B is a schematic backside view of a case in which the movable accessory member is positioned at one end of a movable range as viewed from the backside of the fixed accessory member.
Figure 12C:
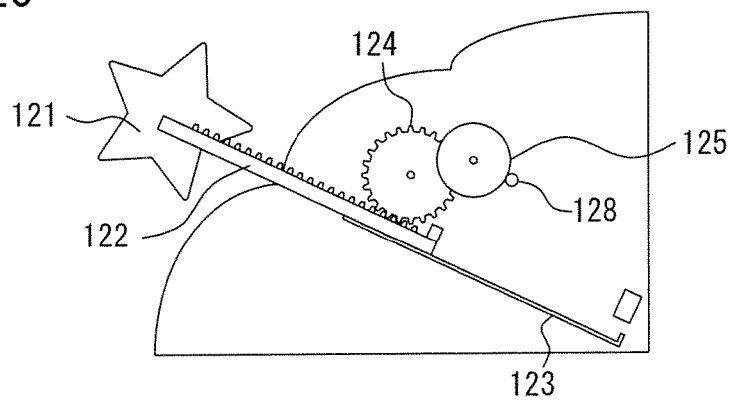
FIG. 12C is a schematic backside view of a case in which the movable accessory member is positioned at the other end of the movable range as viewed from the backside of the fixed accessory member.

FIG. 12A is a schematic front view of the movable accessory member 106 driven by the DC motor control device 112, viewed through the fixed accessory member 105, and FIG. 12B is a schematic backside view of a case in which the movable accessory member 106 is positioned at one end of the movable range as viewed from the backside of the fixed accessory member 105, and FIG. 12C is a schematic backside view of a case in which the movable accessory member 106 is positioned at the other end of the movable range as viewed from the backside of the fixed accessory member 105.

In this embodiment, the movable accessory member 106 has a star-shaped decorative member 121 and a rod-like support member 122 that supports the decorative member 121 at one end. The support member 122 is engaged with a rail 123 provided on the backside of the fixed accessory member 105 so as to be in contact with the lower end of the support member 122 in an oblique direction from the lower left end to the upper right of the game board 101, and is held straight movably along the rail 123. In this example, as illustrated in FIG. 12B, when the movable accessory member 106 is positioned at the left lower side end of the movable range, the decorative member 121 is hidden behind the fixed accessory member 105 and becomes invisible to a player, viewed from the front side of the game board 101. On the other hand, as illustrated in FIG. 12C, when the movable accessory member 106 is positioned at the upper right end of the movable range, an entire decorative member 121 is positioned closer to the center side of the game board 101 than the fixed accessory member 105, so that the player can visually recognize the entire decorative member 121.

Teeth as a linear gear are formed on the upper surface side of the support member 122, and such teeth are engaged with a reduction gear 124 installed near an end position on the left lower end side of the support member 122 when the movable accessory member 106 is positioned on the right upper side end of the movable range. The reduction gear 124 is engaged with a gear 127 attached to the rotary shaft 126 of the DC motor 125. Therefore, as the DC motor 125 rotates by a certain angle, the movable accessory member 106 moves by a certain movement amount corresponding to the rotational angle via the gear 127 and the reduction gear 124. Then, the DC motor 125 is controlled by the DC motor control device 112.

Based on a state signal indicating the gaming state transmitted from the main control circuit 110 to the performance CPU 111, the performance CPU 111 determines target coordinates of the movable accessory member 106, and generates the control command in accordance with the determination. Then, the performance CPU 111 outputs the generated control command to the DC motor control device 112. For example, the performance CPU 111 transmits the control command to the DC motor control device 112, for specifying the rotation amount of the DC motor 125 corresponding the moving distance of the movable accessory member 106 from the current position to the left lower end of the movable range as the target rotation amount, so that the movable accessory member 106 is hidden behind the fixed accessory member 105, before the game ball enters the winning ball member 108.

On the other hand, when it is detected that the game ball has entered the winning ball member 108 and the state signal indicating this matter is inputted to the performance CPU 111 from the main control circuit 110, the performance CPU 111 generates the control command for specifying the rotation amount of the DC motor 125 corresponding to the moving distance of the movable accessory member 106 from the current position to the right upper end of the movable range as the target rotation amount, and transmits this control command to the DC motor control device 112.

Thus, the DC motor control device 112 is the DC motor control device according to the abovementioned embodiment or the modified example thereof, and controls the DC motor 125 so that the DC motor 125 stops at a point when it is rotated by the target rotation amount, based on the control command received from the performance CPU 111 and the detection signals received from the rotary encoder 128. At that time, the DC motor control device 112 increments the number of steps by 1 every time it receives the detection signal of the number of times corresponding to the sampling rate from the rotary encoder 128, thereby controlling the rotation amount of the DC motor 125 depending on the number of steps. Thereby, the DC motor control device 112 can accurately move the movable accessory member 106 to the movement destination in accordance with the performance without increasing the circuit scale.

The star-shaped decorative member 121 may be rotatably supported by the rod-like support member 122. The decorative member 121 may also be driven by another DC motor (not illustrated) controlled by the DC motor control device 112. In this case, in order to count the number of steps indicating the rotation amount of the DC motor for driving the decorative member 121, the DC motor control device 112 may use a sampling rate different from the sampling rate applied to the DC motor 125.

Thus, those skilled in the art can make various modifications within the scope of the present invention in accordance with the embodiment to be implemented.

REFERENCE SIGNS LIST

1 DC motor control device
2-1, 2-2 DC motor
3-1, 3-2 Motor drive circuit
4-1, 4-2 Rotary encoder
10 Communication interface circuit
11 Communication circuit
12-1, 12-2 Register
13-1, 13-2 Sensor interface circuit
14-1, 14-2 Step counter circuit
15-1, 15-2 Control circuit
16-1, 16-2 Drive signal generation circuit
17-1, 17-2 Drive unit
100 Pinball machine
101 Game board
102 Ball reception unit
103 Operation unit
104 Displayer
105 Fixed accessory member
106 Movable accessory member
107 Rail
108 Winning ball member
110 Main control circuit
111 Performance CPU
112 DC motor control device
121 Decorative member
122 Support member
123 Rail
124 Reduction gear
125 DC motor
126 Rotary shaft
127 Gear
128 Rotary encoder

What is claimed is:
1. A DC motor control device that controls a DC motor, comprising:
a communication circuit configured to receive a control command specifying a target rotation amount for the DC motor;
a sensor interface configured to receive a detection signal from a rotational angle sensor that outputs the detection signal every time the DC motor rotates by a certain rotational angle;
a step counter that outputs a count signal every time the detection signal has been received a certain number of times;
a controller that, based on the number of times the count signal is received, determines a step count indicating the total amount of rotation from the start of the rotation of the DC motor, and generates a control signal that controls the DC motor in accordance with the step count and the target rotation amount; and a drive signal generation circuit that generates a drive signal that rotates the DC motor in accordance with the control signal and outputs the drive signal.

2. The DC motor control device according to claim 1, wherein the control command includes information indicating the certain number of times, and the step counter sets the certain number of times based on the information.

3. The DC motor control device according to claim 1, wherein the controller sets the certain number of times, so that the number of times of reception of the count signal corresponding to the total amount of rotation of the DC motor when the movable body driven by the DC motor moves from one end to the other end of a movable range of the movable body, is equal to or less than a certain upper limit value.

4. A game machine, comprising:
a game machine main body;
a movable body movably disposed on a front surface of the game machine main body;
a DC motor that drives the movable body;
a rotational angle sensor that outputs a detection signal every time the DC motor rotates by a certain rotational angle;
a DC motor control device that controls the DC motor; and
a performance controller that controls a performance in accordance with a gaming state,
wherein, the performance controller generates a control command for specifying a target rotation amount of the DC motor corresponding to a moving distance of the movable body from a current position to a movement destination in accordance with the gaming state, and transmits the control command to the DC motor control device, and
wherein the DC motor control device includes:
a communication circuit configured to receive the control command;
a sensor interface configured to receive the detection signal from the rotational angle sensor;
a step counter that outputs a count signal every time the detection signal has been received a certain number of times;
a controller that, based on the number of times the count signal is received, determines a step count indicating the total amount of rotation from the start of the rotation of the DC motor, and generates a control signal that controls the DC motor in accordance with the step count and the target rotation amount; and
a drive signal generation circuit that generates a drive signal that rotates the DC motor in accordance with the control signal and outputs the drive signal.

* * * * *